(12) United States Patent
Mohammad et al.

(10) Patent No.: US 8,674,994 B2
(45) Date of Patent: Mar. 18, 2014

(54) PRESENTATION OF DEPENDENCIES IN GANTT CHARTS

(75) Inventors: Imran Mohammad, Westford, MA (US); Hendrik van den Broek, Lexington, MA (US); Santosh Astagi, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/193,924

(22) Filed: Jul. 29, 2011

(65) Prior Publication Data

US 2012/0306880 A1 Dec. 6, 2012

Related U.S. Application Data

(60) Provisional application No. 61/493,753, filed on Jun. 6, 2011.

(51) Int. Cl.
*G06T 11/00* (2006.01)

(52) U.S. Cl.
USPC ............................ 345/440; 715/741; 715/762

(58) Field of Classification Search
None
See application file for complete search history.

(56) References Cited

U.S. PATENT DOCUMENTS

| | | | |
|---|---|---|---|
| 7,114,126 B2 * | 9/2006 | Berger et al. ................. | 715/750 |
| 7,249,356 B1 | 7/2007 | Wilson et al. | |
| 7,330,822 B1 * | 2/2008 | Robson et al. ............... | 705/7.15 |
| 7,546,577 B2 * | 6/2009 | Do et al. ....................... | 717/108 |
| 2006/0004618 A1 | 1/2006 | Brixius | |
| 2006/0123331 A1 * | 6/2006 | Hightower et al. ........... | 715/505 |
| 2007/0150327 A1 | 6/2007 | Dromgold | |
| 2008/0027776 A1 | 1/2008 | Sourov et al. | |
| 2008/0270929 A1 * | 10/2008 | Bohn et al. .................... | 715/772 |
| 2009/0249215 A1 * | 10/2009 | Paek ............................. | 715/740 |
| 2010/0302260 A1 * | 12/2010 | De Lissandri ................ | 345/502 |
| 2011/0265188 A1 * | 10/2011 | Ramaswamy et al. ......... | 726/28 |
| 2011/0320319 A1 * | 12/2011 | Streich ......................... | 705/27.1 |
| 2012/0198390 A1 * | 8/2012 | Bogusky et al. .............. | 715/854 |

OTHER PUBLICATIONS

Microsoft, "Format the bar chart portion of a Gantt view," Microsoft Corporation, retrieved Aug. 13, 2012 from http://office.microsoft.com/en-us/project-help/format-the-bar-chart-portion-of-a-gantt-view-HA001225368.aspx, Copyright 2010, 6 pages.*
Author Unknown "DlhSoft Gantt Chart Library for Windows® Forms 2.0," DlhSoft, retrieved Apr. 13, 2011 from: http://dlhsoft.com/GanttChartLibrary/2.0/Home.aspx, Copyright 2004, 2 pages.
Author Unknown, "dhtmlxGantt," DHTMLX Ltd., retrieved Nov. 9, 2011 from: http://docs.dhtmix.com/doku.php?id=dhtmlxgantt:toc, Copyright 1998, 2 pages.

(Continued)

*Primary Examiner* — Daniel Hajnik
*Assistant Examiner* — Andrew G Yang
(74) *Attorney, Agent, or Firm* — Kilpatrick Townsend & Stockton LLP (57) ABSTRACT

Various arrangements for adjusting display of a dependency on a Gantt chart are presented. A first indication may be received that indicates an end-user is permitted to control display of the dependency. The Gantt chart may be displayed with the dependency. A second indication may be received that indicates to hide the dependency. The Gantt chart may be displayed with the dependency hidden.

15 Claims, 8 Drawing Sheets

(56) References Cited

OTHER PUBLICATIONS

Author Unknown, "Editable JavaScrit Gantt Chart with Rich Script API," DHTMLX Ltd., retrieved Nov. 9, 2011 from: http://dhtmlx.com/docs/products/dhtmlxGantt/index.shtml, Copyright 1998, 2 pages.

Author Unknown, "Format the bar chart portion of a Gantt view," Microsoft Corporation, retrieved Apr. 14, 2011 from http://office.microsoft.com/en-us/project-help/format-the-bar-chart-portion-of-a-gantt-view-HA001225368.aspx, Copyright 2011, 4 pages.

Author Unknown, "IBM ILOG JViews Gantt 8.7 API," IBM, retrieved Apr. 11, 2011 from: http://publib.boulder.ibm.com/infocenter/jviewent/v8r7/index.jsp?topic=/com.ibm.ilog.jviews.gantt.doc/html/refjava/html/ilog/views/gantt/llvGanttConfiguration.html, Copyright 1996, 41 pages.

Author Unknown, "JIDE Gantt Chart Developer Guide" J IDE SOFTWARE, retrieved Nov. 9, 2011 from: http://www.jidesoft.com/products/JIDE_Gantt_Chart_Developer_Guide.pdf, Copyright 2002, 10 pages.

Author Unknown, "JSGantt," API JSGantt, retrieved Apr. 13, 2011 from: http://www.jsgantt.com/docs/JSGantt..htmi, Copyright 2009 Yahoo! Inc., 3 pages.

Author Unknown, "JSGantt.GanttChart," JSGantt API, retrieved Apr. 14, 2011 from: http://www.jsgantt.com/docs/JSGantt.GanttChart.html#method_drawDependency, Copyright 2009 Yahoo! Inc., 4 pages.

Author Unknown, "The Product Features of Our Gantt Software VARCHART XGantt," NETRONIC, retrieved Apr. 14, 2011 from: http://www.netronic.com/gantt/gantt-software/gantt-chart-software.html, Copyright TYPO3 Agentur, 8 pages.

Author Unknown, "TILOS 7 Improves the Gantt Chart," Linear project GmbH, retrieved Nov. 9, 2011 from: http://www.tilos.org/fileadmin/downloads/doc/T7/Whats-new-in-TILOS7.pdf, 8 pages.

Author Unknown "VARCHART JGantt—Overview," NETRONIC, retrieved Apr. 7, 2011 from: http://www.netronic.com/gantt/gantt-charts.html, 2 pages.

Gantz, et al., "100% Free Javascript / CSS/ HTML Gantt chart control. Completely buzzword compliant including AJAX !", jsGantt 1.2, retrieved Apr. 13, 2011 from: http://www.jsgantt.com/, 3 pages.

* cited by examiner

PRESENTATION OF DEPENDENCIES IN GANTT CHARTS

CROSS-REFERENCES

This application claims priority to Pat. Appl. No. 61/493,753, filed Jun. 6, 2011 in the United States, entitled "Capability to Show and Hide Dependency Lines in Gantt Charts." This provisional application is incorporated in its entirety for all purposes. This application is related to patent application Ser. No. 13/224,585, filed Sep. 2, 2011 in the United States, entitled "Retrieving Multiple Element Selections in Gantt Charts." This application is incorporated in its entirety for all purposes.

BACKGROUND

A Gantt chart is a type of chart that may be used to illustrate schedules and resource allocation. For example, pertaining to a schedule, a Gantt chart can be used to illustrate the start and finish dates of various elements of a project. Gantt charts can also show dependencies between elements. Such dependencies can represent relationships between various elements of the chart. For example, a dependency may be that element A must be completed before element B can begin. Other examples of dependencies may be that two or more elements must start or finish at the same time.

SUMMARY

Various systems, methods, and devices are presented for adjusting display of a dependency on a Gantt chart. In some embodiments, a method for adjusting display of a dependency on a Gantt chart is presented. The method may include receiving, by a computer system, a first indication that indicates an end-user is permitted to control display of the dependency. The method may include generating, by the computer system, the Gantt chart for display with the dependency. The dependency may be graphically represented. The dependency may represent a relationship between a first element of the Gantt chart and a second element of the Gantt chart. The method may include receiving, by the computer system, a second indication that indicates to hide the dependency. The method may include generating, by the computer system, the Gantt chart for display with the dependency is hidden. The dependency being hidden may be at least partially based on the first indication and the second indication.

In some embodiments, prior to receiving the first indication, the method includes receiving a third indication that indicates a default dependency display state. The default dependency display state may have the dependency displayed. Generating the Gantt chart for display with the dependency may be at least partially based on the default dependency display state. In some embodiments, the first indication and the third indication are received from a system administrator. The second indication may be received from the end-user. The dependency may be graphically represented by an arrow originating from the first element and ending at the second element. The dependency may be one of a plurality of dependencies present on the Gantt chart. Generating the Gantt chart for display with the dependency may comprise generating the Gantt chart for display with the plurality of dependencies. Generating the Gantt chart for display with the dependency hidden may comprise generating the Gantt chart for display with the plurality of dependencies hidden. The second indication may be based on a single end-user input.

In some embodiments, a computer program product residing on a non-transitory processor-readable medium is presented. The computer program product may comprise processor-readable instructions configured to cause a processor to receive a first indication that indicates an end-user is permitted to control display of a dependency. The processor-readable instructions may also cause a Gantt chart to be generated for display. The dependency may be graphically represented. The dependency may represent a relationship between a first element of the Gantt chart and a second element of the Gantt chart. The processor-readable instructions may also cause the processor to receive a second indication that indicates to hide the dependency. The processor-readable instructions may cause the Gantt chart to be generated for display with the dependency is hidden. The dependency being hidden may be at least partially based on the first indication and the second indication.

In some embodiments, a system for adjusting display of a dependency on a Gantt chart is presented. The system may include a processor. The system may include a memory communicatively coupled with and readable by the processor and having stored therein a series of processor-readable instructions. The processor-readable instructions, when executed, may cause the processor to receive a first indication that indicates an end-user is permitted to control display of the dependency. The processor-readable instructions, when executed, may also cause the processor to cause the Gantt chart to be generated for display. The dependency may be graphically represented. The dependency may represent a relationship between a first element of the Gantt chart and a second element of the Gantt chart. The processor-readable instructions, when executed, may also cause the processor to receive a second indication to be received that indicates to hide the dependency. The processor-readable instructions, when executed, may also cause the processor to cause the Gantt chart to be generated for display, with the dependency is hidden. The dependency being hidden may be at least partially based on the first indication and the second indication.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A Gantt chart is a form of chart that can be used to represent a schedule of a project. Information that can be represented in a Gantt chart includes various elements of the schedule, which may be referred to as tasks. Each task may be graphically represented, such as by a bar. Each task may have a start date and end date. As such, if the x-axis of the Gantt chart represents time, a horizontal bar representing a task may stretch from a start date to an end date. A task may be assigned to a specific person or a group of persons. Within the Gantt chart, individual tasks may be indicated, possibly graphically, as partially complete. For example, 60% of a bar representing a task may be shaded to represent that the task is 60% complete.

In addition to illustrating various tasks, the Gantt chart may illustrate various dependencies. A dependency may represent a relationship between two (or more) elements. One element may be dependent on one or more characteristics (e.g., the start date or the end date) of another element. Types of dependencies may include: 1) a second element that cannot begin until a first element has been completed; 2) a second element that cannot begin until a first element has been started; 3) a first element that must begin at the same time as a second element; 4) a first element that must finish at the same time as a second element; and 5) a first element that must start before a second element finishes. Other forms of dependencies may also be possible.

A dependency may be represented on a Gantt chart by a line, such as an arrow, between two elements. As an example, an arrow originating from a first element and terminating at a second element may indicate that the second element can only be started once the first element has been completed. As the number of elements and dependencies increase, the amount of information attempted to be presented to an end-user via a Gantt chart may increase. This may result in situations such as: 1) a display of the Gantt chart appearing confusing to the end-user; and/or 2) the Gantt chart taking an undesirably long period of time to render properly on a computer's display. As such, a user may not be able to utilize the Gantt chart effectively, be it due to factors such as a cluttered display and/or undesirably long render times.

As such, rather than displaying graphical representations of dependencies (alternatively referred to as "displaying the dependencies") at all times, an end-user may be permitted to toggle between dependencies being displayed and hidden. Dependencies between elements may be displayed if the end-user has indicated that dependencies be displayed; graphical representations of dependencies may be hidden (alternatively referred to as "hiding the dependencies") if the end-user has indicated that dependencies be hidden. An administrator (who, along with the end-user, may be an employee of an entity on whose behalf the software that creates Gantt charts is being operated) may identify: 1) whether end-users are permitted to toggle between dependencies being displayed or hidden; and 2) the default dependency display mode of the dependencies (displayed or hidden).

Figure 1:
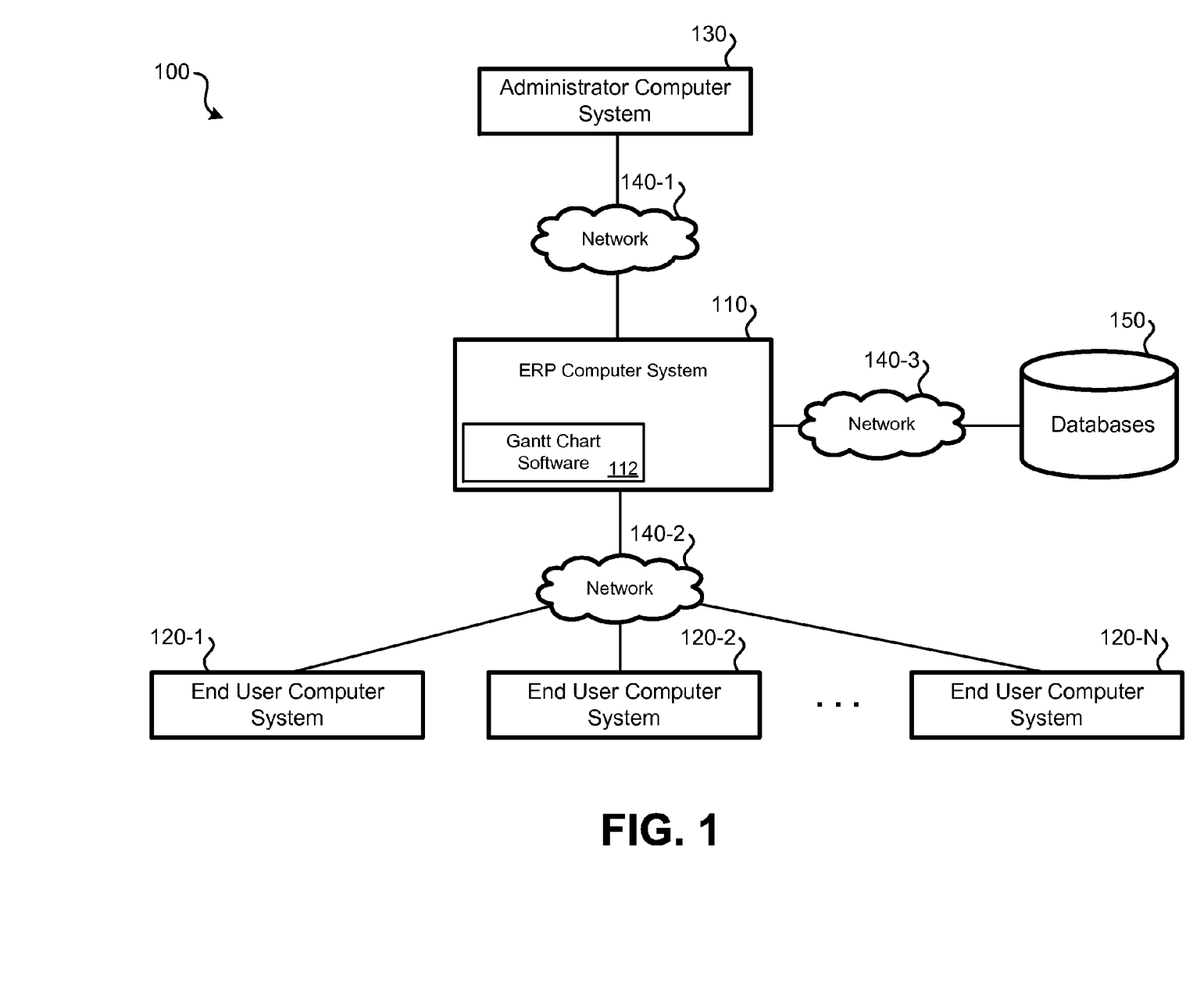
FIG. 1 illustrates an embodiment of a system for executing Gantt chart software.

FIG. 1 illustrates an embodiment of a system 100 for executing Gantt chart software. System 100 may include: Enterprise Resource Planning (ERP) computer system 110, which may execute Gantt chart software 112, end-user computer systems 120, administrator computer system 130, networks 140, and databases 150.

ERP computer system 110 may include one or more computer servers that execute software capable of creating and/or modifying Gantt charts. ERP computer system 110 may be used to execute one or more enterprise-level applications, which may be accessed by end-users via one or more end-user computer systems 120. FIG. 1 illustrates ERP computer system 110 executing only Gantt chart software 112; however it should be understood that additional enterprise software applications may also be executed by ERP computer system 110. Further, while FIG. 1 illustrates ERP computer system 110 executing Gantt chart software 112, it should be understood that in some embodiments Gantt chart software 112 may be fully or partially executed locally by end-user computer systems 120.

ERP computer system 110 may be in communication with one or more local and/or remote databases. In the illustrated embodiment of system 100, ERP computer system 110 is in communication with remote databases 150. Information stored in databases 150 may be related to the operations of the entity (e.g., the company) on whose behalf ERP computer system 110 is operated. Information from databases 150 may be used to populate some or all elements of Gantt charts displayed using Gantt chart software 112.

One or more end-user computer systems 120 may be in communication with ERP computer system 110. From each end-user computer system of end-user computer systems 120, an end-user may be able to interact with Gantt chart software 112 executed by ERP computer system 110. In some embodiments, Gantt chart software 112 may be executed locally by end-user computer systems 120. In such embodiments, end-user computer systems 120 may use ERP computer system 110 to access databases 150. The illustrated embodiment of system 100 contains three end-user computer systems (120-1, 120-2, and 120-N). As should be understood, more or fewer end-user computer systems 120 may be in communication with ERP computer system 110. End-user computer systems 120 may render Gantt charts for display to end-users. Rendering of such Gantt charts may be quicker if graphical representations of dependencies are not rendered.

Also in communication with ERP computer system 110 may be administrator computer system 130. Administrator computer system 130 may be operated by an administrator. The administrator may be a user of ERP computer system 110 that has system privileges (greater than those of an end-user) that allow the administrator to control various aspects of how Gantt chart software 112 is configured. Such system privileges may not be provided to end-users that are operating end-user computer systems 120. Administrator computer system 130 may permit an administrator to select whether end-users are permitted to toggle between displaying and hiding dependencies between elements in Gantt charts created using Gantt chart software 112. Administrator computer system 130 may also permit an administrator to define a default of whether dependencies are displayed or hidden when an end-user accesses Gantt chart software 112.

When an end-user accesses Gantt chart software 112 via an end-user computer system of end-user computer systems 120, the display of dependencies on a Gantt chart in Gantt chart software 112 may be controlled at least in part based on the input setting received from the administrator via administrator computer system 130. For example, if the administrator indicated that end-users are not to have control over toggling the display of dependencies, the end-user may only be able to view the dependencies as previously determined by the administrator. If the administrator has indicated that the end-user is permitted to toggle between displaying or hiding dependencies, the end-user may be presented either the displayed dependencies or hidden dependencies depending on the default display mode selected by the administrator. An end-user may not have the ability to modify either: 1) whether end-users are permitted to toggle the display of dependencies; or 2) whether dependencies are by default displayed or hidden.

Administrator computer system 130 may communicate with ERP computer system 110 via network 140-1. Network 140-1 may represent one or more public and/or private networks. For example, a public network may be the Internet. An example of a private network is a corporate intranet. Similarly, end-user computer systems 120 communicate with ERP computer system 110 via network 140-2. Network 140-2 may represent the same network or a different network from network 140-1. ERP computer system 110 may communicate with one or more databases that are local and/or remote. In the illustrated embodiment of system 100, databases 150 are remote from ERP computer system 110 and communicate with ERP computer system 110 via network 140-3. Network 140-3 may represent the same network or a different network from network 140-1 and network 140-2.

The illustrated embodiment of system 100 illustrates end-user computer systems 120 and administrator computer system 130 as distinct from each other. It should be understood that end-user computer systems 120 and the administrator computer system 130 may be similar; however the login credentials used to access ERP computer system 110 may vary for administrators and end-users. As such, whether a user of ERP computer system 110 is considered an administrator or an end-user (and whether the user's computer is designated an end-user computer system or an administrator computer system) may be based on the user's login credentials. Accordingly, a computer system may vary between being designated an end-user computer system or an administrator computer system depending on the login credentials of the user operating the computer system.

Figure 2:
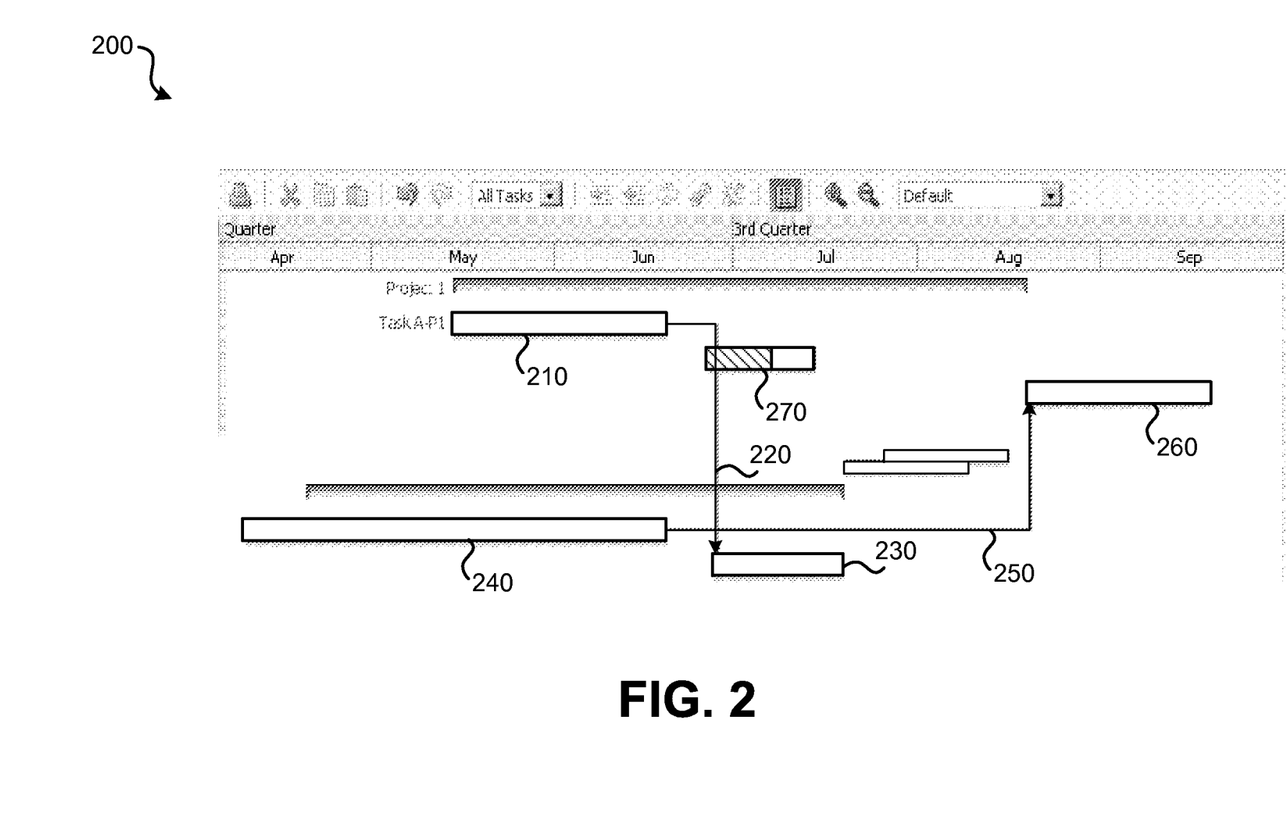
FIG. 2 illustrates an embodiment of an interface displaying a Gantt chart with dependencies.

Gantt chart software 112 may be used to render various Gantt charts with dependencies either displayed or hidden at end-user computer systems 120. FIG. 2 illustrates an embodiment of an interface 200 displaying a Gantt chart with displayed dependencies. Interface 200 may be displayed using Gantt chart software 112 of system 100. Interface 200 may also be displayed using some other form of Gantt chart software. A line or arrow may be used to show a dependency between two elements. Referring to FIG. 2, an embodiment of an interface 200 displaying a Gantt chart with dependencies is illustrated. Element 230 is illustrated as dependent on element 210. This dependency is graphically represented by arrow 220. Element 260 is dependent on element 240, graphically represented by arrow 250. Element 270 is illustrated as roughly 70% complete, as represented by the approximate 70% shading of element 270. While the Gantt chart of interface 200 is fairly simple with less than ten elements illustrated, other Gantt charts may contain many more elements and dependencies.

Figure 3:
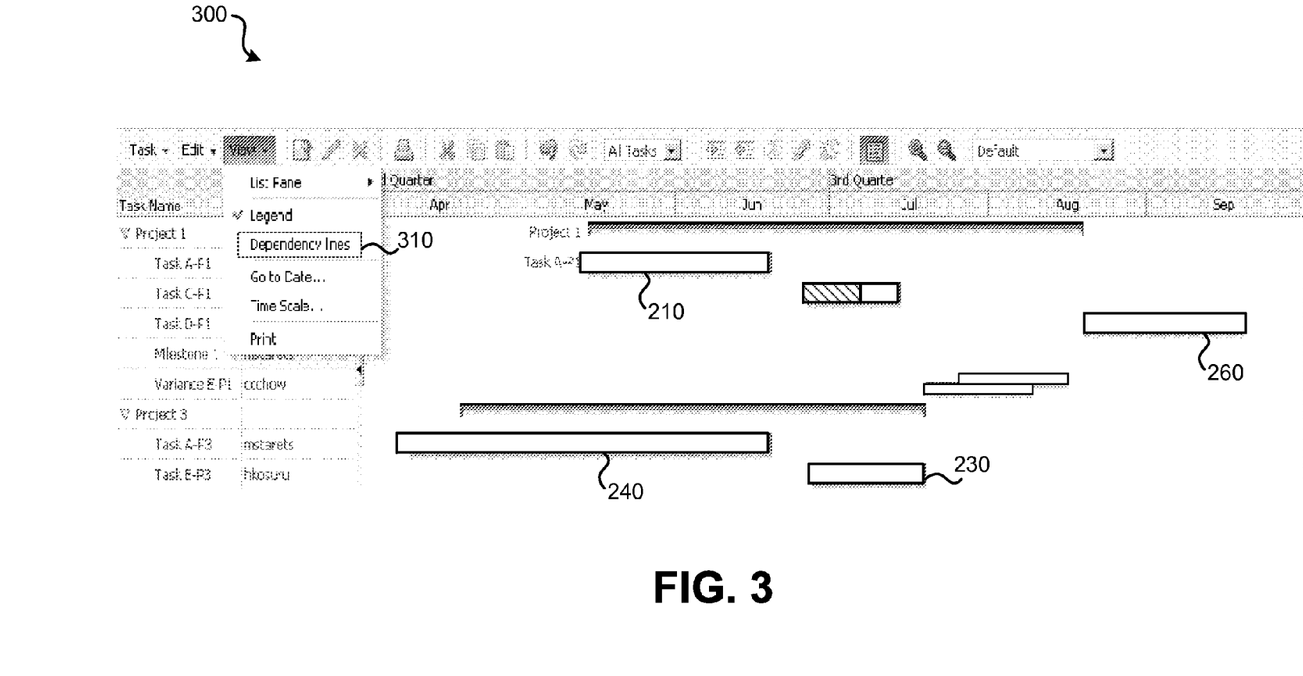
FIG. 3 illustrates an embodiment of an interface displaying a Gantt chart with dependencies hidden.

As such, being able to toggle the display of dependencies on a Gantt chart may provide an end-user with a more intelligible display of the Gantt chart and/or may allow the Gantt chart to be rendered faster by the computer system rendering the Gantt chart. FIG. 3 illustrates an embodiment of an interface 300 displaying a Gantt chart with hidden dependencies. Interface 300 displays the same Gantt chart as the Gantt chart of interface 200 with dependencies hidden. Having the dependencies hidden (e.g., not drawn) may allow the Gantt chart of interface 300 to be rendered faster than the Gantt chart of interface 200. While element 210 and element 230 of interface 200 are displayed in interface 300, a graphical representation of the dependency between element 210 and element 230 is not displayed. Similarly, element 240 and element 260 are illustrated, but a graphical representation of the dependency between these elements is not displayed (hidden). As such, the dependencies may remain in effect and are stored, but the dependencies are not visible to the end-user. As such, the displayed Gantt chart may be less cluttered and/or may allow display of the Gantt chart to render faster.

An administrator may or may not permit an end-user to toggle whether graphical representations of dependencies are displayed or hidden. Referring to FIG. 3, menu selection 310 may be provided to an end-user. Menu selection 310 may only be presented if an administrator has enabled the ability for an end-user to toggle the display of dependencies. The initial, default mode of menu selection 310, having dependencies either displayed or hidden, may be selected by the administrator. Using menu selection 310, the end-user may select whether or not graphical representations of dependencies are displayed. As such, in interface 300, because menu selection 310 is unselected, graphical representations of dependencies are not displayed. It should be understood that menu selection 310 may be presented in other forms to an end-user. For example, the end-user may be able to enable and display the display of dependencies via inputs, such as a button, keystroke, text-based command, etc. Further, menu selection 310 may permit an end-user to display or hide one, multiple, or all dependencies in a Gantt chart by providing a single user input. For example, a single user input may refer to clicking a single soft button or selecting a single menu item.

Figure 4:
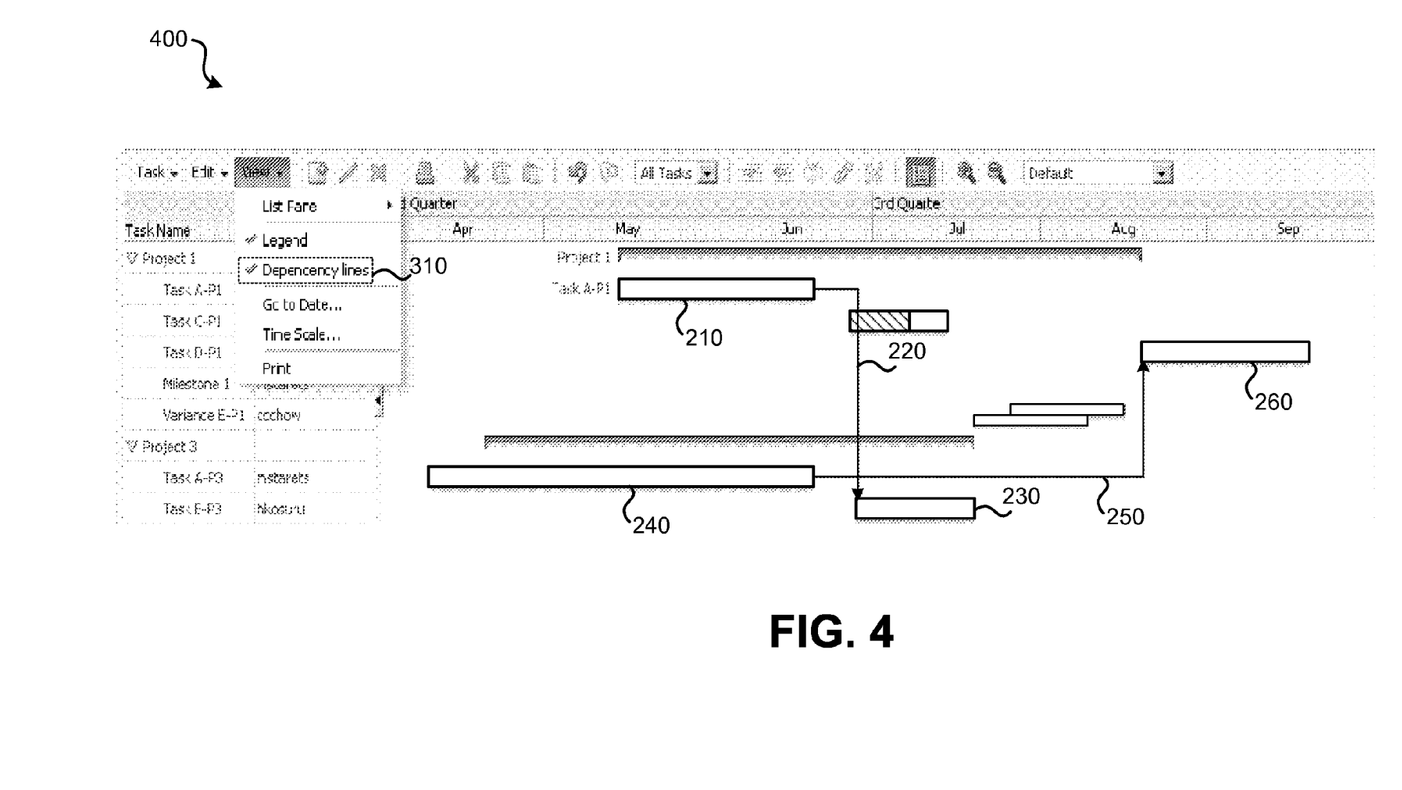
FIG. 4 illustrates an embodiment of an interface displaying a Gantt chart having a menu selection that is used to toggle the display of dependencies.

FIG. 4 illustrates an embodiment of an interface 400 displaying a Gantt chart where a menu selection is used to enable the display of dependencies. Interface 400 may display the same Gantt chart as interface 300 of FIG. 3; however, by the end-user selecting menu selection 310, display of dependencies has been toggled, thus showing the dependencies. The toggling results in graphical representations of the dependencies being displayed. As such, arrow 220 is displayed to show the dependency between element 210 and element 230. Similarly, arrow 250 is displayed to show the dependency between element 240 and element 260.

Figure 5:
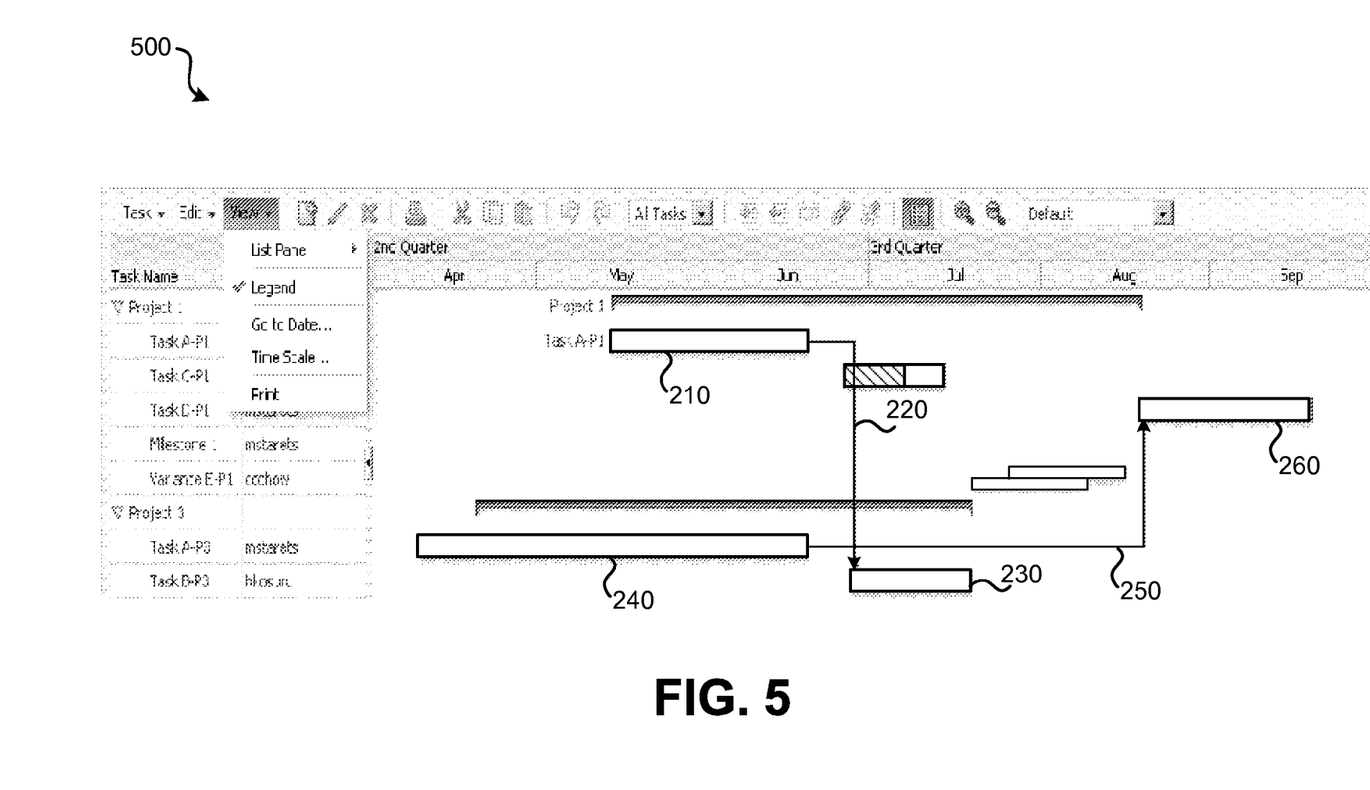
FIG. 5 illustrates an embodiment of an interface displaying a Gantt chart in which an end-user does not have the option of selecting whether dependencies are displayed or hidden.

FIG. 5 illustrates an embodiment of an interface 500 displaying a Gantt chart in which an end-user does not have the option of selecting whether dependencies are displayed or hidden. The administrator may select that dependencies are always displayed or hidden to an end-user. While the administrator may have the option to modify whether dependencies are displayed or hidden, the end-user may be restricted by the selection made by the administrator. In interface 500, the administrator has selected that dependencies are always to be displayed. As such, no menu selection is presented to the end-user that allows the end-user to specify whether dependencies are displayed or hidden. In some embodiments, a menu selection, such as menu selection 310 of FIG. 3, may still be presented to the end-user but may be disabled (e.g., "grayed out"). As should be understood, other ways of presenting the end-user with information related to the end-user's inability to control the display of dependencies may be used. For example, a soft button that controls display of dependencies may be displayed but disabled. As another example, when a menu selection such as menu selection 310 of FIG. 3 is selected, a message may appear informing the end-user that menu selection 310 has been disabled. While interface 500 displays a Gantt chart where dependencies are displayed based on the selection of the administrator, another embodiment of interface 500 may have dependencies hidden based on the selection of the administrator.

Figure 6:
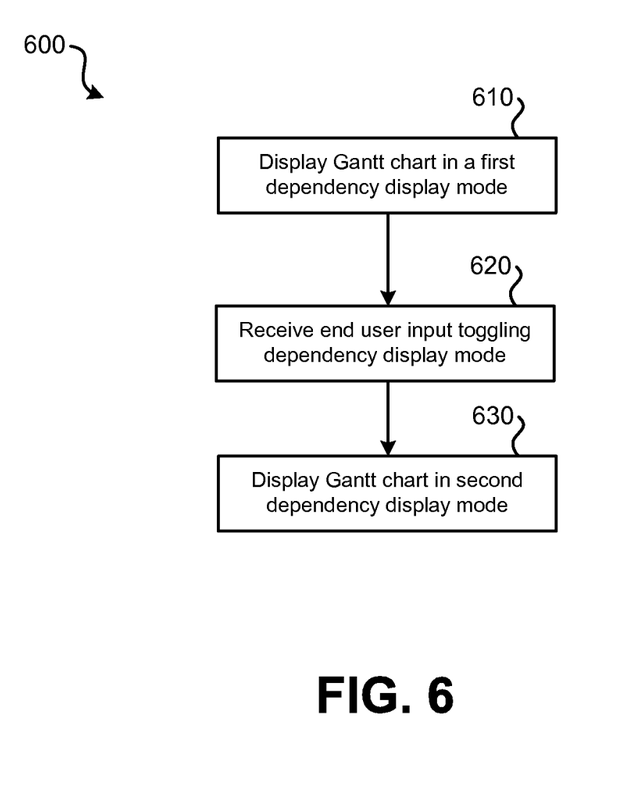
FIG. 6 illustrates an embodiment of a method for displaying and hiding dependencies on a Gantt chart.

System 100 of FIG. 1 may be used to perform various methods to display Gantt charts with dependencies displayed or hidden, depending on input from an administrator and/or an end-user. System 100 may be used to display the interfaces of FIGS. 2-5 via an end-user of end-user computer systems 120. FIG. 6 illustrates an embodiment of a method for displaying and hiding one or more dependencies of a Gantt chart. Method 600 may be performed by system 100 of FIG. 1, or by some other system configured to create and modify Gantt charts. Method 600 may allow Gantt charts similar to those depicted in FIGS. 2-5 to have dependencies shown and hidden. Method 600 may also be used to show and hide dependencies in other forms of Gantt charts.

At step 610, a Gantt chart may be displayed in a first dependency display mode. The first dependency display mode may be a default dependency display mode previously selected by an administrator, such as via administrator computer system 130 of system 100. The default dependency display mode may involve dependencies either being displayed or hidden. In some embodiments, the first dependency display mode is set to a previous dependency display mode selection selected by the end-user, possibly during the end-user's previous session interacting with the Gantt chart software. Displaying the Gantt chart may involve the end-user's end-user computer system (such as end-user computer system 120-1 of FIG. 1) rendering the Gantt chart. The rendered Gantt chart may be displayed on a display screen, such as an LCD or CRT display. Processing related to display of the Gantt chart may occur at the end-user computer system, an ERP computer system, or may be split between the computer systems.

At step 620, input may be received from an end-user that specifies to toggle the dependency display mode. The input may be in the form of a menu selection, such as selecting menu item 310 of FIG. 3. The input may also take such forms as: a keystroke, clicking a soft button, or a voice command. The input may be transmitted to the ERP computer system or may be processed by the end-user computer system, possibly depending on which computer system is executing the Gantt client software. If at step 610 the first dependency display mode was set to display the dependencies, toggling the dependency display mode results in graphical representations of the dependencies of the Gantt chart being hidden. If at step 610 the first dependency display mode was set to not display graphical representations of the dependencies, toggling the dependency display mode results in the dependencies of the Gantt chart being displayed. The input received from the end-user may be a single user input, such as a single menu selection or a single selection of a soft button.

At step 630, the second dependency display mode is used to display the Gantt chart to the end-user via the end-user computer system. As such, if the first dependency display mode of step 610 was to display graphical representations of the dependencies, at step 630, the second dependency display mode may hide graphical representations of the dependencies of the Gantt chart. If the first dependency display mode of step 610 was to hide graphical representations of the dependencies, at step 630 the second dependency display mode may display graphical representations of the dependencies of the Gantt chart. As previously discussed, displaying the Gantt chart may involve the end-user's end-user computer system rendering the Gantt chart. The rendered Gantt chart may be displayed on a display screen, such as an LCD or CRT display. Rendering of the Gantt chart may take longer when dependencies are displayed rather than hidden. The processing related to display of the Gantt chart may occur at the end-user computer system, ERP computer system, or may be split by both.

Following step 630, if another input is received indicating the user has again toggled the dependency display mode (e.g., repeats step 620), method 600 may return to step 610. Method 600 may continue to shift between step 610 and step 630 if the user continues to toggle the dependency display mode. It should be understood that method 600 assumes that the end-user is permitted to toggle the dependency display mode. As such, method 600 may require that an administrator has enabled a setting in the Gantt chart software that permits the end-user to toggle the dependency display mode.

Figure 7:
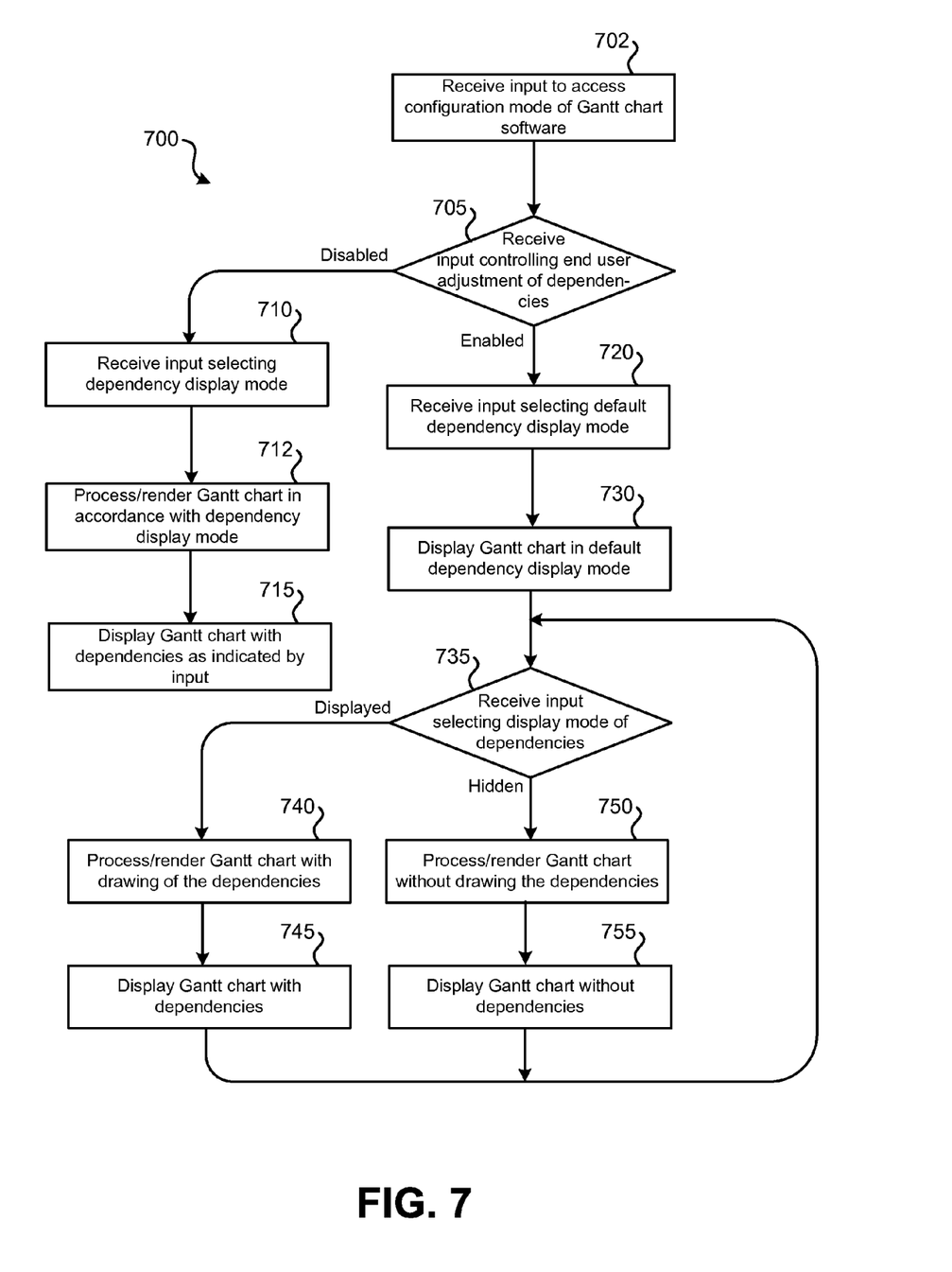
FIG. 7 illustrates another embodiment of a method for displaying and hiding dependencies on a Gantt chart.

FIG. 7 illustrates another embodiment of a method for displaying and hiding graphical representations of dependencies in a Gantt chart. Method 700 may represent a more detailed embodiment of method 600. Method 700 may be performed by system 100 of FIG. 1, or by some other system configured to display Gantt charts. Method 700 may allow Gantt charts similar to those depicted in FIGS. 2-5 to have graphical representations of one or more dependencies shown and hidden.

At step 702, input from an administrator accessing a configuration mode of the Gantt chart software may be received. Referring to system 100 of FIG. 1, an administrator, using a computer system such as administrator computer system 130, may access Gantt chart software 112 being executed by ERP computer system 110. In some embodiments, even if the Gantt chart software is executed locally by end-user computer systems, configuration settings may be stored by an ERP computer system. The administrator may also access Gantt chart software 112 by directly interacting with ERP computer system 110. The administrator may access the configuration mode of the Gantt chart software by providing login credentials. These login credentials may be linked with a user account that is authorized to configure the Gantt chart software. The administrator may access the configuration mode of the Gantt chart software to initially configure the Gantt chart software, such as when the Gantt chart software is initially installed and/or before end-users are permitted to access the Gantt chart software. The administrator may also access the configuration mode of the Gantt chart software to reconfigure the Gantt chart software.

At step 705, the administrator, while accessing the configuration mode of the Gantt chart software, may provide input to the computer system executing the Gantt chart software (or the computer system that maintains configuration settings for the Gantt chart software) that indicates whether end-users are permitted to toggle display of dependencies in the Gantt chart software. In some embodiments, the administrator makes a selection that applies to all end-users. In other embodiments, the administrator may assign different groups of end-users different permissions such that some end-users are permitted to toggle the display of dependencies while other end-users are prohibited from toggling the display of dependencies.

If at step 705 the administrator disabled the ability for some or all end-users to toggle the display of dependencies, method 700 may proceed to step 710. At step 710, input to the Gantt chart software may be received from the administrator that selects the dependency display mode that will be used to display Gantt charts to end-users. The administrator may select to display or hide graphical representations of the dependencies. At step 712, processing and/or rendering related to the display of the Gantt chart in accordance with the dependency display may be performed. Such rendering may be performed at the ERP computer system and/or the end-user computer system. At step 715, the dependencies in the Gantt charts, as displayed to the end-user by the Gantt chart software, may reflect the selection of the dependency display mode made by the administrator at step 710. The end-user may not be presented with the ability to toggle the dependency display mode.

If at step 705 the administrator enabled the ability for some or all end-users to toggle the display of dependencies, method 700 may proceed to step 720. At step 720, input to the Gantt chart software may be received from the administrator that selects the dependency display mode that will initially be used to display Gantt charts to end-users. The default dependency display mode may only be used when the end-user accesses the Gantt chart software for the first time or may be used as the default each time the end-user accesses the Gantt chart software. If the default dependency display mode is used only when the end-user accesses the Gantt chart for the first time, each subsequent time the end-user accesses the Gantt chart software, the previous end-user selected dependency display mode may be used.

At step 730, a Gantt chart, which may be selected for loading by the end-user, may be initially displayed to the end-user in the default dependency display mode indicated by the input received at step 720. In some embodiments, rather than using the default display mode selected by the administrator, the previously used dependency display mode used by that end-user may be used. As an example, if the default dependency display mode is that graphical representations of dependencies are to be displayed or the previous dependency display mode used by the end-user is that graphical representations of dependencies are to be displayed, a Gantt chart, such as the Gantt chart displayed in interface 200 of FIG. 2, may be displayed at step 730. As another example, if the default dependency display mode is that graphical representations of dependencies are hidden or the previous dependency display mode used by the end-user is that graphical representations of dependencies are hidden, a Gantt chart such as the Gantt chart displayed in interface 300 of FIG. 3 may be displayed at step 730. Display of the Gantt chart may involve the end-user's end-user computer system (such as end-user computer system 120-1 of FIG. 1) rendering the Gantt chart. The rendered Gantt chart may be displayed on a display screen, such as an LCD or CRT display. Processing related to rendering may also be performed remotely, such as by ERP computer system 110 of FIG. 1, or by a combination of the computer systems.

At step 735, input may be received indicating the end-user has toggled between dependency display modes. The selection may involve an indication of input from the end-user being transmitted to and received by the computer system executing the Gantt chart software. The end-user's input may be in the form of a menu selection, such as selecting menu item 310 of FIG. 3. The input may also take such forms as: a keystroke, clicking a soft button, or a voice command.

If at step 720 the first dependency display mode was set to hide graphical representations of the dependencies, the end-user-provided input that toggles the dependency display mode results in step 740 being performed. At step 740, the Gantt chart may be processed and/or rendered with the dependencies drawn. The processing/rendering may be performed by the computer system displaying the Gantt chart to the end-user, such as end-user computer system 120-1 of FIG. 1. The processing/rendering may also be performed by the computer system executing the Gantt chart software, such as ERP computer system 110 of FIG. 1. As discussed previously, in some embodiments the end-user computer system may be executing the Gantt chart software, and thus, may perform all of the processing/rendering of the Gantt chart. At step 745, the Gantt chart with the displayed graphical representations of the dependencies may be displayed to the end-user by the end-user computer system.

If at step 720 the first dependency display mode was set to display the graphical representations of dependencies, toggling the dependency display mode results in step 750 being performed. At step 750, the Gantt chart may be processed and/or rendered without the dependencies. The processing/rendering may be performed by the computer system displaying the Gantt chart to the end-user, such as end-user computer system 120-1 of FIG. 1. The processing/rendering may also be performed by the computer system executing the Gantt chart software, such as ERP computer system 110 of FIG. 1. As discussed previously, in some embodiments the end-user computer system may be executing the Gantt chart software, and, thus, may perform the rendering of the Gantt chart. At step 755, the Gant chart without graphical representations of the dependencies may be displayed to the end-user by the end-user computer system.

Following either step 745 or step 755, the method may return to step 735. If the end-user again toggles between dependency display modes, either steps 740 and 745 may be performed or steps 750 and 755 may be performed. Method 700 may continue as long as the end-user continues to provide input that toggles the display mode of the dependencies.

Figure 8:
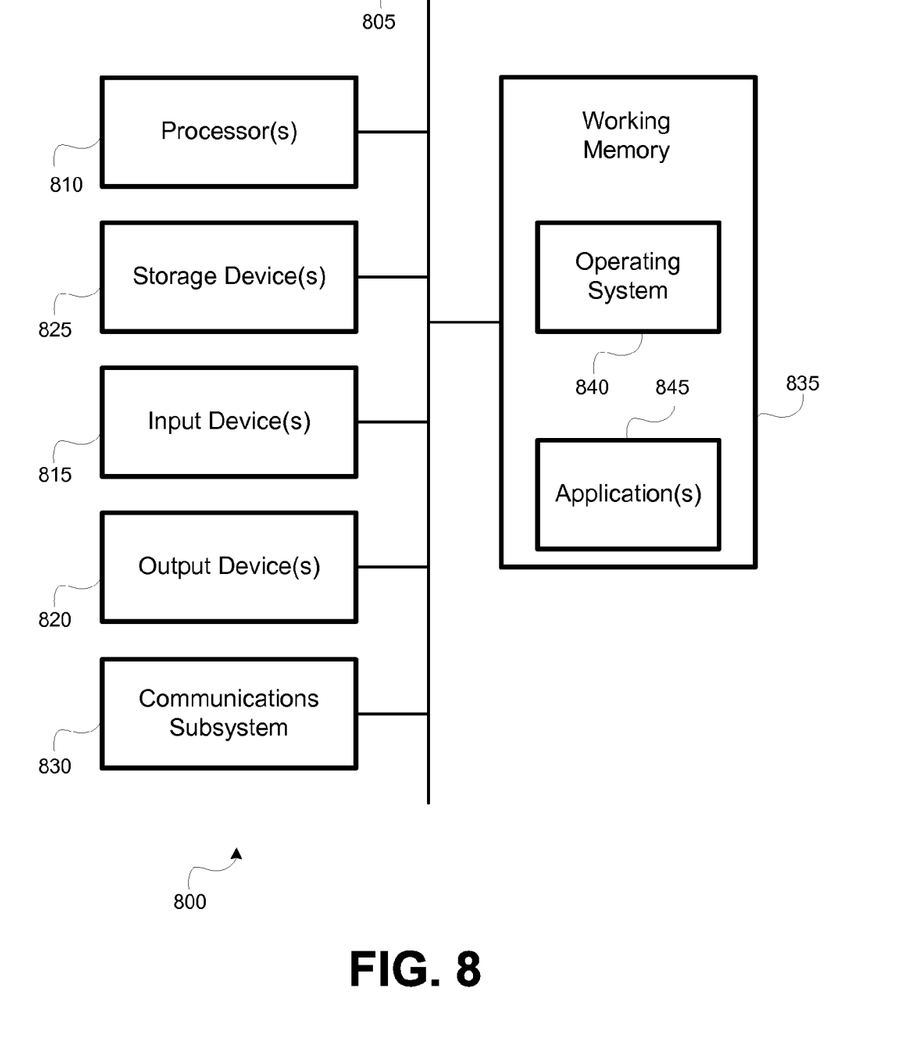
FIG. 8 illustrates an embodiment of a computer system.

Such display of a Gantt chart with dependencies either hidden or displayed may be performed using an ERP computer system, an end-user computer system, and/or an administrator computer system. FIG. 8 illustrates an embodiment of a computer system which may function as such computer systems. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for adjusting display of a dependency on a Gantt chart, the method comprising:
    configuring, by the computer system, an administration interface to provide access to a configuration mode, wherein the configuration mode allows:
        remote administrator definition of a first set of end-users for whom a first set of dependencies are permitted to be visible and a second set of end-users for whom a second set of dependencies are permitted to be visible;
        remote administrator definition of end-user ability to control one or more dependencies of the first set of dependencies and of one or more dependencies of the second set of dependencies; and
        remote administrator definition of default display states of one or more dependencies of the first set of dependencies and of one or more dependencies of the second set of dependencies;
    receiving, by the computer system, a first visibility indication that indicates an end-user corresponds to the first set of end-users for whom the first set of dependencies are permitted to be visible, wherein the first set of dependencies comprises the dependency;
    receiving, by the computer system, a second visibility indication that indicates the end-user does not correspond to the second set of end-users for whom the second set of dependencies are permitted to be visible;
    receiving, by the computer system, a default display state indication that indicates a default display state of the dependency;
    receiving, by the computer system, a first indication that indicates the end-user is permitted to control display of the dependency;
    wherein one or more of the first visibility indication, the second visibility indication, and/or the first indication correspond to administrator selections received via the administration interface;
    generating, by the computer system, the Gantt chart for display at least partially based on the first visibility indication, the second visibility indication, and the default display state indication, with the dependency visible and with the second set of dependencies hidden, wherein the dependency is graphically represented, and the dependency represents a relationship between a first element of the Gantt chart and a second element of the Gantt chart;
    receiving, by the computer system, a second indication that indicates to hide the dependency, wherein the second indication is based on a single input from the end-user; and
    generating, by the computer system, the Gantt chart for display with the dependency hidden, wherein:
        the dependency being hidden is at least partially based on the first indication and the second indication.

2. The method for adjusting display of the dependency on the Gantt chart of claim 1, wherein the default display state indication is received prior to receiving the first indication and;
    corresponds to one or more administrator selections received via the administration interface.

3. The method for adjusting display of the dependency on the Gantt chart of claim 2, wherein
    the first indication is received from a system administrator, and
    the second indication is received from the end-user.

4. The method for adjusting display of the dependency on the Gantt chart of claim 1, wherein the dependency is graphically represented by an arrow originating from the first element and ending at the second element.

5. The method for adjusting display of the dependency on the Gantt chart of claim 1, wherein
    the dependency is one of a plurality of dependencies present on the Gantt chart,
    generating the Gantt chart for display with the dependency comprises generating the Gantt chart for display with the plurality of dependencies, and
    generating the Gantt chart for display with the dependency hidden, comprises generating the Gantt chart for display with the plurality of dependencies hidden.

6. A computer program product residing on a non-transitory processor-readable medium and comprising processor-readable instructions configured to cause a processor to:
    configure an administration interface to provide access to a configuration mode, wherein the configuration mode allows:
        remote administrator definition of a first set of end-users for whom a first set of dependencies are permitted to be visible and a second set of end-users for whom a second set of dependencies are permitted to be visible;
        remote administrator definition of end-user ability to control one or more dependencies of the first set of dependencies and of one or more dependencies of the second set of dependencies; and
        remote administrator definition of default display states of one or more dependencies of the first set of dependencies and of one or more dependencies of the second set of dependencies;
    receive a first visibility indication that indicates an end-user corresponds to the first set of end-users for whom the first set of dependencies are permitted to be visible, wherein the first set of dependencies comprises a dependency;
    receive a second visibility indication that indicates the end-user does not correspond to the second set of end-users for whom the second set of dependencies are permitted to be visible;
    receiving a default display state indication that indicates a default display state of the dependency;

receive a first indication that indicates the end-user is permitted to control display of the dependency;
wherein one or more of the first visibility indication, the second visibility indication, and/or the first indication correspond to administrator selections received via the administration interface;
cause a Gantt chart to be generated for display with the dependency visible and with the second set of dependencies hidden, at least partially based on the first visibility indication, the second visibility indication, and the default display state indication, wherein
the dependency is graphically represented, and
the dependency represents a relationship between a first element of the Gantt chart and a second element of the Gantt chart;
receive a second indication that indicates to hide the dependency, wherein the second indication is based on a single input from the end-user; and
cause the Gantt chart to be generated for display with the dependency hidden, wherein:
the dependency being hidden is at least partially based on the first indication and the second indication.

7. The computer program product of claim 6, wherein the default display state indication is received prior to receiving the first indication and
corresponds to one or more administrator selections received via the administration interface.

8. The computer program product of claim 7, wherein
the first indication is received from a system administrator, and
the second indication is received from the end-user.

9. The computer program product of claim 6, wherein the dependency is graphically represented by an arrow originating from the first element and ending at the second element.

10. The computer program product of claim 6, wherein
the dependency is one of a plurality of dependencies present on the Gantt chart,
the processor-readable instructions configured to cause the processor to display the Gantt chart, wherein the dependency is graphically represented, further comprises:
processor-readable instructions configured to cause the processor to cause the Gantt chart to be generated for display wherein the plurality of dependencies are each graphically represented, and
the processor-readable instructions configured to cause the processor to cause the Gantt chart to be generated for display, wherein the dependency is hidden further comprises:
processor-readable instructions configured to cause the processor to cause the Gantt chart to be generated for display with the plurality of dependencies hidden.

11. A system for adjusting display of a dependency on a Gantt chart, the system comprising:
a processor; and
a memory communicatively coupled with and readable by the processor and having stored there in a series of processor-readable instructions which, when executed by the processor, cause the processor to:
configure an administration interface to provide access to a configuration mode, wherein the configuration mode allows:
remote administrator definition of a first set of end-users for whom a first set of dependencies are permitted to be visible and a second set of end-users for whom a second set of dependencies are permitted to be visible;
remote administrator definition of end-user ability to control one or more dependencies of the first set of dependencies and of one or more dependencies of the second set of dependencies; and
remote administrator definition of default display states of one or more dependencies of the first set of dependencies and of one or more dependencies of the second set of dependencies;
receive a first visibility indication that indicates an end-user corresponds to the first set of end-users for whom the first set of dependencies are permitted to be visible, wherein the first set of dependencies comprises a dependency;
receive a second visibility indication that indicates the end-user does not correspond to the second set of end-users for whom the second set of dependencies are permitted to be visible;
receiving a default display state indication that indicates a default display state of the dependency;
receive a first indication that indicates the end-user is permitted to control display of the dependency;
wherein one or more of the first visibility indication, the second visibility indication, and/or the first indication correspond to administrator selections received via the administration interface;
cause the Gantt chart to be generated for display with the dependency visible and with the second set of dependencies hidden, at least partially based on the first visibility indication, the second visibility indication, and the default display state indication, wherein
the dependency is graphically represented, and
the dependency represents a relationship between a first element of the Gantt chart and a second element of the Gantt chart;
receive a second indication to be received that indicates to hide the dependency, wherein the second indication is based on a single input from the end-user; and
cause the Gantt chart to be generated for display, with the dependency hidden, wherein:
the dependency being hidden is at least partially based on the first indication and the second indication.

12. The system for adjusting display of the dependency on the Gantt chart of claim 11, wherein the default display state indication is received prior to receiving the first indication and
corresponds to one or more administrator selections received via the administration interface.

13. The system for adjusting display of the dependency on the Gantt chart of claim 12, wherein
the second indication is received from a system administrator, and
the first indication is received from the end-user.

14. The system for adjusting display of the dependency on the Gantt chart of claim 11, wherein the dependency is graphically represented by an arrow originating from the first element and ending at the second element.

15. The system for adjusting display of the dependency on the Gantt chart of claim 11, wherein
the dependency is one of a plurality of dependencies present on the Gantt chart, and
the processor-readable instructions configured to cause the processor to cause the Gantt chart to be generated for display, wherein the dependency is graphically represented, further comprise:
processor-readable instructions configured to cause the processor to cause the Gantt chart to be generated for display wherein the plurality of dependencies is graphically represented, and the processor-readable instructions configured to cause the processor to cause the Gantt chart to be generated for display, wherein the dependency is hidden, further comprise:
  processor-readable instructions configured to cause the processor to cause the Gantt chart to be generated for display with the plurality of dependencies hidden.

* * * * *

UNITED STATES PATENT AND TRADEMARK OFFICE
CERTIFICATE OF CORRECTION

| | | |
|---|---|---|
| PATENT NO. | : 8,674,994 B2 | Page 1 of 1 |
| APPLICATION NO. | : 13/193924 | |
| DATED | : March 18, 2014 | |
| INVENTOR(S) | : Mohammad et al. | |

It is certified that error appears in the above-identified patent and that said Letters Patent is hereby corrected as shown below:

On title page 2, column 1, under Other Publications, line 1, delete "JavaScrit" and insert
-- JavaScript --, therefor.

Signed and Sealed this
Eighth Day of July, 2014

Michelle K. Lee
*Deputy Director of the United States Patent and Trademark Office*